(12) United States Patent
Wolf et al.

(10) Patent No.: US 11,835,651 B2
(45) Date of Patent: Dec. 5, 2023

(54) LIGHT DETECTION AND RANGING DEVICE

(71) Applicant: ROBOTEMI LTD., Tel Aviv (IL)

(72) Inventors: Yosef Arie Wolf, Tel Aviv (IL); Gal Goren, Beit Oren (IL); Efraim Vitzrabin, Holon (IL); Roee Finkelshtain, Tel Aviv (IL); Gregory Heifets, Rehovot (IL); Mark Vaynberg, Petah Tikva (IL); Pavel Lindberg, Hadera (IL)

(73) Assignee: ROBOTEMI LTD., Tel Aviv (IL)

( * ) Notice: Subject to any disclaimer, the term of this patent is extended or adjusted under 35 U.S.C. 154(b) by 56 days.

(21) Appl. No.: 17/505,905

(22) Filed: Oct. 20, 2021

(65) Prior Publication Data

US 2022/0043119 A1 Feb. 10, 2022

Related U.S. Application Data

(63) Continuation of application No. 15/889,527, filed on Feb. 6, 2018, now abandoned.

(60) Provisional application No. 62/454,960, filed on Feb. 6, 2017.

(51) Int. Cl.
*G01S 7/48* (2006.01)
*G01S 7/481* (2006.01)
*G01S 17/08* (2006.01)
*G01S 17/42* (2006.01)
*G01S 17/48* (2006.01)
*G01S 7/4863* (2020.01)
*G01S 7/4914* (2020.01)

(52) U.S. Cl.
CPC .......... *G01S 7/4808* (2013.01); *G01S 7/4811* (2013.01); *G01S 7/4817* (2013.01); *G01S 7/4863* (2013.01); *G01S 7/4914* (2013.01); *G01S 17/08* (2013.01); *G01S 17/42* (2013.01); *G01S 17/48* (2013.01)

(58) Field of Classification Search
CPC .... G01S 7/4808; G01S 7/4811; G01S 7/4817; G01S 7/4863; G01S 7/4914; G01S 17/08; G01S 17/42; G01S 17/48; G01S 11/12
USPC ....................................................... 356/4.01
See application file for complete search history.

(56) References Cited

U.S. PATENT DOCUMENTS

2008/0285842 A1 11/2008 Plasberg et al.

FOREIGN PATENT DOCUMENTS

EP 1927867 A1 6/2008
EP 2894491 A2 7/2015

*Primary Examiner* — Daniel L Murphy
(74) *Attorney, Agent, or Firm* — The Roy Gross Law Firm, LLC; Roy Gross

(57) ABSTRACT

A light detection and ranging device, a robot, and a method, the light detection and ranging device comprising: a light source; and a camera comprising at least one row of pixel sensors, wherein the camera comprises at least one row of pixel sensors, and wherein light emitted by the light source is on a same plane as a field of view of the at least one row of pixel sensors.

13 Claims, 5 Drawing Sheets

LIGHT DETECTION AND RANGING DEVICE

RELATED APPLICATIONS

This application is a continuation of U.S. patent application Ser. No. 15/889,527 filed on Feb. 6, 2018, which claims the benefit of priority of U.S. Provisional Patent Application No. 62/454,960 filed on Feb. 6, 2017. The contents of the above applications are all incorporated by reference as if fully set forth herein in their entirety.

BACKGROUND

The present disclosure relates to light detection and ranging devices (LIDARs).

Light detection and ranging generally refers to a method for determining distance of an object or a location from a point. Light detection and ranging comprises illuminating a target with a light beam, and using the reflected light for determining the distance to the light source. In some applications the distance to the nearest object in each direction around the light source may be determined, thus providing a mapping of the light source environment. By projecting a narrow laser beam, physical features in the environment may be mapped with high resolutions.

Light detection and ranging devices (Lidars) are used for a variety of purposes, including outdoor uses such as creating high-resolution maps, with applications in Geodesy, archaeology; geography; geology; geomorphology; seismology; forestry; atmospheric physics; laser guidance; airborne laser swath mapping (ALSM); or laser altimetry, as well as indoor uses.

The main components included in common Lidar system traditionally include:

a light source, usually a laser source, which may use almost any wavelength, including ultraviolet, visible, or near infrared light, wherein the wavelength can be selected to suit the target: from about 10 micrometers to UV which is of approximately 250 nm. Different types of scattering can also be used for different Lidar applications;

Scanning and optic components: mechanical and optical systems, such as a lens assembly for making the light beam scan the azimuths and elevations which are required to be mapped, and have the scans performed at the required rate;

photodetector or receiver electronics: a component for capturing the light as it hits an object or receiving the reflected light, upon which the distance may be assessed, and indicating the relevant parameter, such as time, location, phase or the like; and a processing unit for analyzing the received light, determining the distance to the object at the particular direction and optionally performing additional computations based on the distance, for example analyzing a multiplicity of distances at a multiplicity of directions, and thus creating a mapping of the environment surrounding the light source.

The foregoing examples and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a light detection and ranging device, comprising: a light source; and a camera comprising at least one row of pixel sensors, wherein the camera comprises one or more rows of pixel sensors, and wherein light emitted by the light source is on a same plane as a field of view of the at least one row of pixel sensors. Within the device the row of pixel sensors is optionally a vertical row of pixel sensors. Within the device the light source is optionally installed above or below the camera. Within the device, the light source and the camera are optionally installed on a rotating member. Within the device, the light source and the camera are optionally installed on a structure perpendicular to a rotation plane of a rotating member, wherein the rotating member rotates the light source and the camera. Within the device, the row of pixel sensors is optionally perpendicular to a rotation plane of a rotating member, wherein the rotating member rotates the light detection and ranging device.

There is provided, in accordance with another embodiment, a robot comprising: a light source configured to emit a pattern of near-infrared NIR light at a multiplicity of directions, thus forming a light pattern in an environment of the robot; a camera comprising one or more rows of pixel sensors, wherein light emitted by the light source is on a same plane as a field of view of the row of pixel sensors; and a processor configured to: determine a distance between the robot and a location at which light emitted by the light source hits an object, in accordance with which pixel of the at least one row of pixel sensors captured the location. Within the robot, the row of pixel sensors is optionally a vertical row of pixel sensors. Within the robot, the light source is optionally installed above or below the camera. Within the robot, the light source and the camera are optionally installed on a rotating member. Within the robot, the light source and the camera are optionally installed on a structure perpendicular to a rotation plane of a rotating member, wherein the rotating member rotates the light source and the camera. Within the robot, the row of pixel sensors is perpendicular to a rotation plane of a rotating member, wherein the rotating member rotates the light detection and ranging device.

There is provided, in accordance with yet another embodiment, a method for determining a distance of an object from a device, comprising: emitting light in a direction by a light source associated with the device; receiving an indication to which pixel from a row of pixel sensors of a camera which captures a location at which the light hit an object; and determining a distance of the object from the device, in accordance with the pixel, wherein the light emitted by the light source is on a same plane as a field of view of the row of pixel sensors. Within the method, the row of pixel sensors is optionally a vertical row of pixel sensors. Within the method, the light source is optionally installed above or below the camera. Within the method, the light source and the camera are optionally installed on a rotating member. Within the method, the light source and the camera are optionally installed on a structure perpendicular to a rotation plane of a rotating member, wherein the rotating member rotates the light source and the camera. Within the method, the row of pixel sensors is optionally perpendicular to a rotation plane of a rotating member, wherein the rotating member rotates the light detection and ranging device.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Many devices, and in particular mobile devices need a device for mapping their environments, such as a Light Detection and Ranging (Lidar) device, wherein a path may be planned for the mobile device based upon such mapping.

Figure 1:
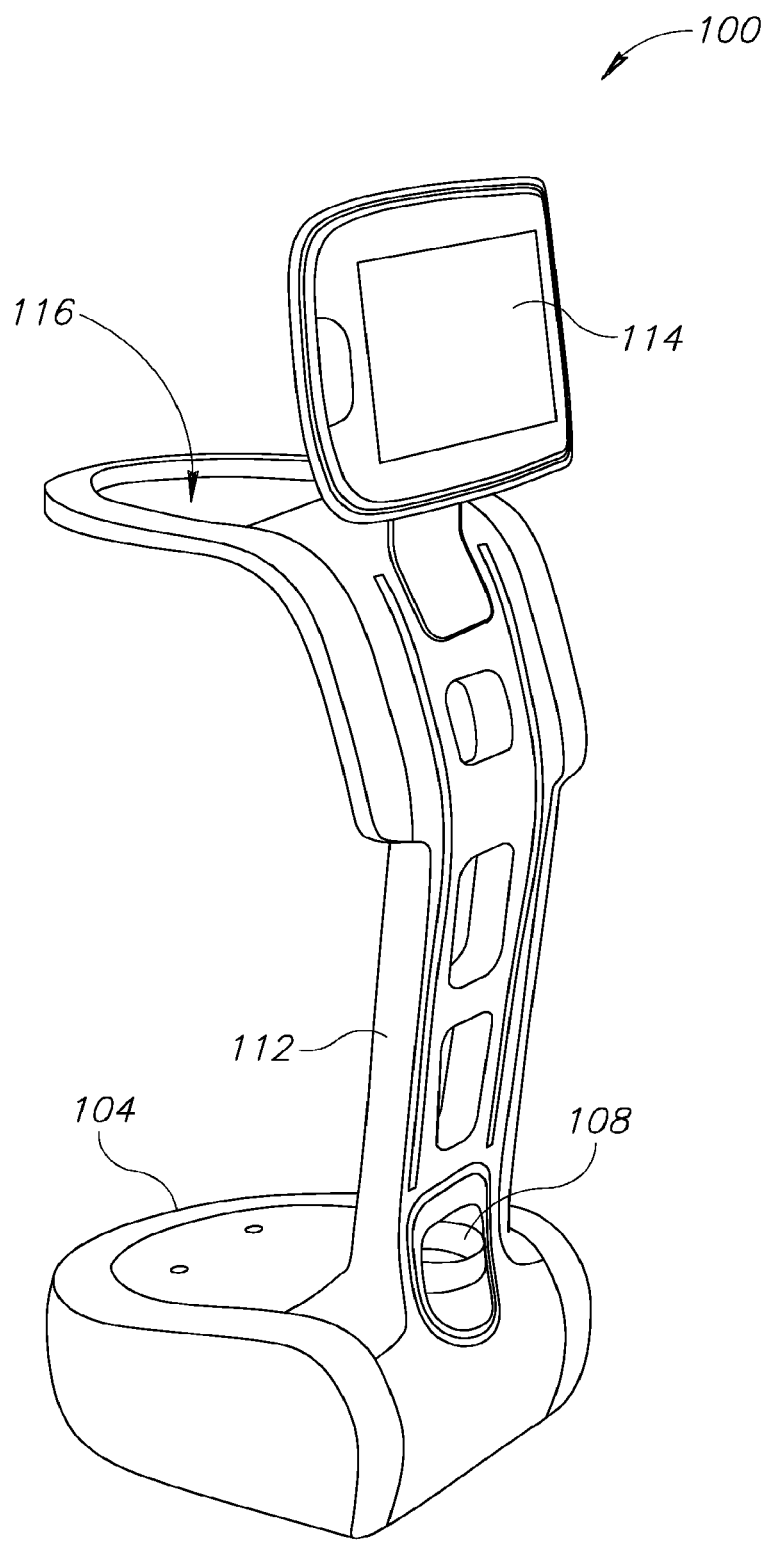
FIG. 1 shows a schematic illustration of a mobile device including a device for mapping the environment.

Referring now to FIG. 1, showing an illustration of a mobile device, such as a robot, comprising a Lidar, wherein the Lidar comprises a light source and a photo receiver or a camera.

The mobile device, generally referenced 100, comprises a steering mechanism which may be located at its bottom part 104, and comprising one or more wheels or one or more bearings, chains or any other mechanism for moving. Device 100 can also comprise a motor for activating the steering mechanism, and a motor controller for providing commands to the motor in accordance with the required motion.

Mobile device 100 can further comprise a mapping device 108, for mapping the environment and thus enabling planning a path and navigating therein. In some embodiments, mapping device 108 may include a light source, such as a laser emitter and a line camera, installed on a rotating element in order to capture the surrounding of mobile device 100.

However, in such embodiments, when mapping device 100 rotates, member 112 which forms a part of a vertical part of mobile device 100, and the corresponding member on the other side of mobile device 100 form static occlusions to mapping device 108, wherein each such member occludes the field of view whether it blocks the light emitted by the light source, or is between objects and the camera, which amounts to a significant part of the 360°.degree It will be appreciated that although mobile device 100 and its structure is exemplary only, this problem may occur with any structure, since the lower areas of the environment surrounding mobile device 100 have to be mapped in order for the device to roam autonomously, while the device generally needs to comprise taller parts for providing functionality, wherein these members may thus form occlusions.

Thus a problem handled by the disclosed subject matter relates to the need to reduce the field of view occlusions of a Lidar formed by a light source and a camera.

Mobile device 100 may also comprise utilities such as tray 116, display 114, or the like.

A Lidar for mapping an environment generally comprises a light source for emitting light in a specific direction; a mechanical and optical system for scanning the environment and directing the light source to a multiplicity of directions; a photodetector for capturing the light as it hits an object or a photoreceiver for receiving the returned light; and a processor for determining the distance based on the returned light.

Some approaches may be used for detecting the hitting or received light and calculating the distance:

One approach relates to the Time of Flight (TOF): a laser pulse is transmitted, and the period of time it takes the light to hit an object and to come back to a detector nearby the transmitter is measured. By multiplying half the time by the speed of light, the distance to the nearest object at the particular direction in which the light was emitted may be determined.

Another approach relates to RF-modulated light sources with phase detectors: the returning phase of the returned light is determined, and by comparing it to the phase of the transmitted light the travel time can be determined, from which the distance can be determined as above.

Figure 2A:
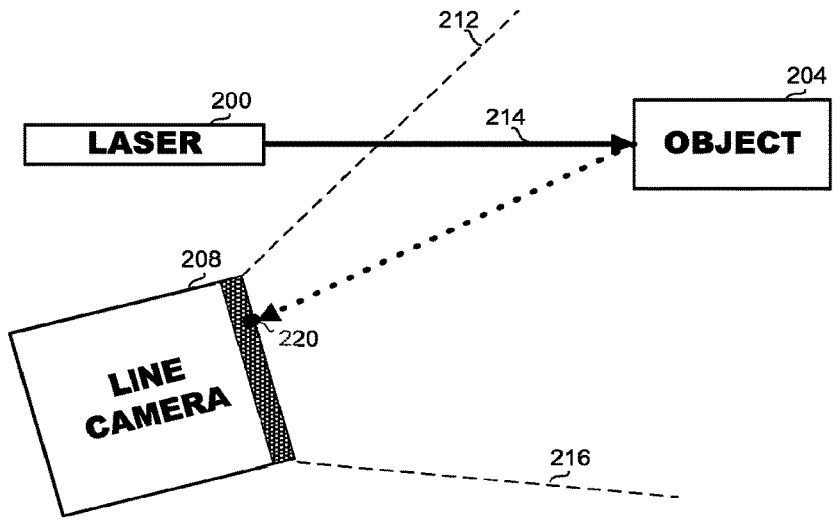
FIG. 2A and FIG. 2B demonstrate determining a distance to an object using a device comprising a laser source and a line camera.
Figure 2B:
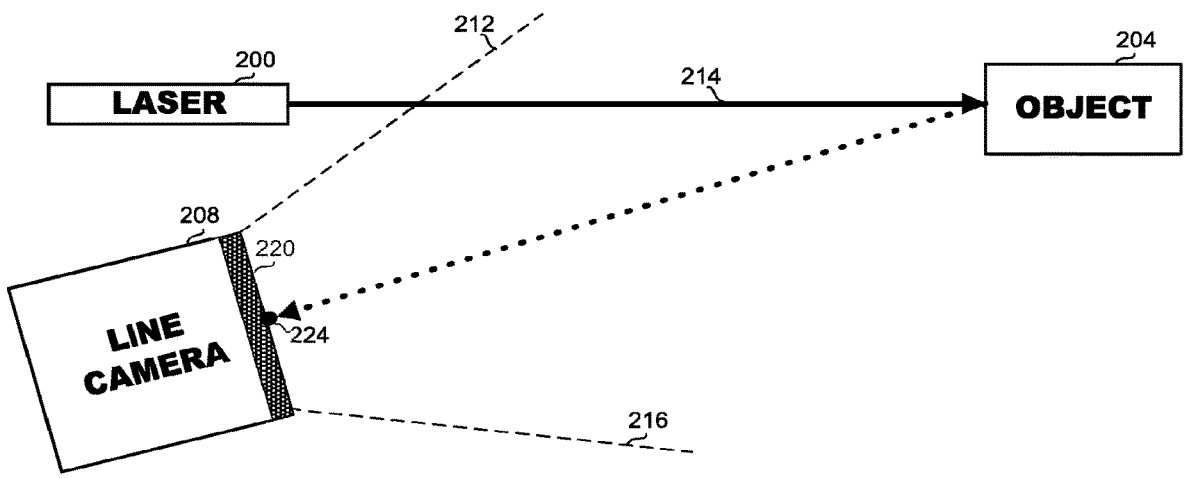

Yet another approach is exemplified in FIG. 2A and FIG. 2B. This approach uses a light source, such as a laser source 200 and a line-scan camera 208, wherein the field of view of line-scan camera 208 spans between virtual rays 212 and 216. The field of view may be determined by a lens assembly associated with the device. Laser source 200 and line-scan camera 208 are arranged such that the light emitted by laser source 200 and the row of pixel sensors 220 of line-scan camera 208 are on the same plane, wherein an angle close to a right angle, for example between 60° and 88° exists between row of pixel sensors 220 and direction 214 at which laser 200 emits light. When laser 200 emits light, the light hits object 204. Line-scan camera 208 can then capture the illuminated location, for example point 224 of FIG. 2A or point 228 of FIG. 2B.

The distance between laser 200 and object 204 is based on the pixel or pixels of pixel sensors 220 which captures the point at which the light hit object 204. When object 204 is closer to laser 200, the pixels of pixel sensors 220 capturing the hitting point will be closer to ray 212, while object 204 being farther from laser 200 will be expressed in the pixels capturing the hitting point being closer to ray 216. The distance and angle between line-scan camera 208 and the ray along direction 214 can be determined in accordance with the expected range of distances between the laser source and objects in the environment and the required resolution. Since the error in measuring distances increases for larger distances, this approach is particularly suitable for smaller distances, for example indoor environments.

It will be appreciated that a regular camera may be used as well wherein the distance is determined upon which pixels along a single line capture the lighted object. However, a line scan camera is generally cheaper and takes up less space.

Figure 3:
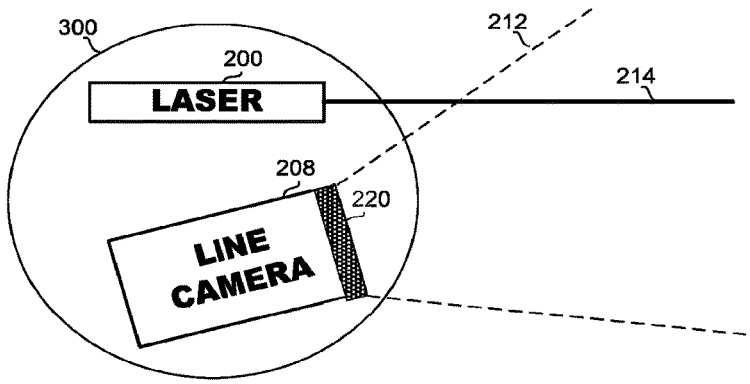
FIG. 3 provides a schematic illustration of a top view of a Lidar device for mapping an environment.

FIG. 3, is a schematic illustration of a top view of a Lidar device for mapping an environment.

In order to map an environment, the system shown in FIG. 2A or 2B is typically fixed to a rotating base 300, such as a rotating disk. The disk may be operatively connected to a motor for rotating the disk at any required rate, for example 2 to 600 rounds per minute. At each angle, in accordance with the required resolution, laser 200 emits light in direction 214, and line camera 208 captures the area where the light hit an object, and which provides for determining the distance to the object. Having the distances around the device provides for mapping the environment, for example for navigation needs.

A problem associated with this approach relates to having a multiplicity of blind areas of the environment, i.e., areas in which objects cannot be detected due to occlusions.

Figure 4A:
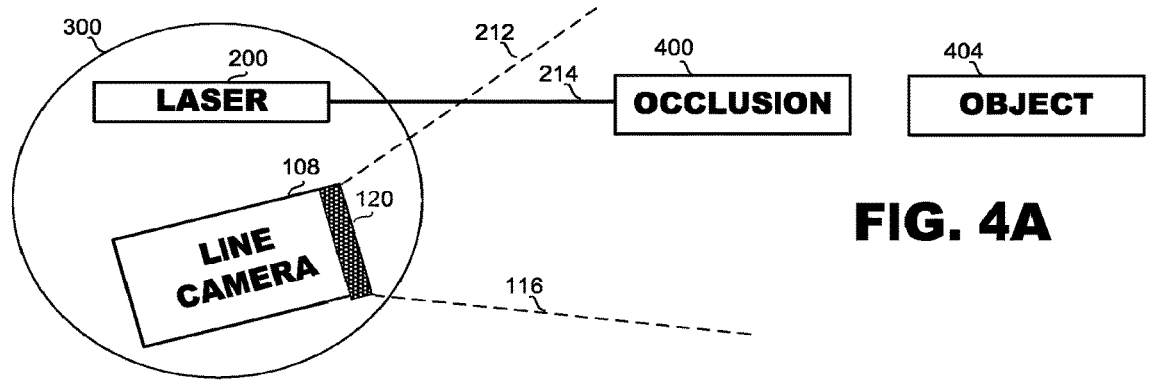
FIG. 4A and FIG. 4B demonstrate an occlusion problem when determining a distance to an object using a device comprising a laser source and a line camera.

As seen in FIG. 4A, at a first position of rotating base 300, occlusion 400 blocks the light emitted by laser 200 from getting to object 404, thus disabling line camera 208 from detecting it.

Figure 4B:
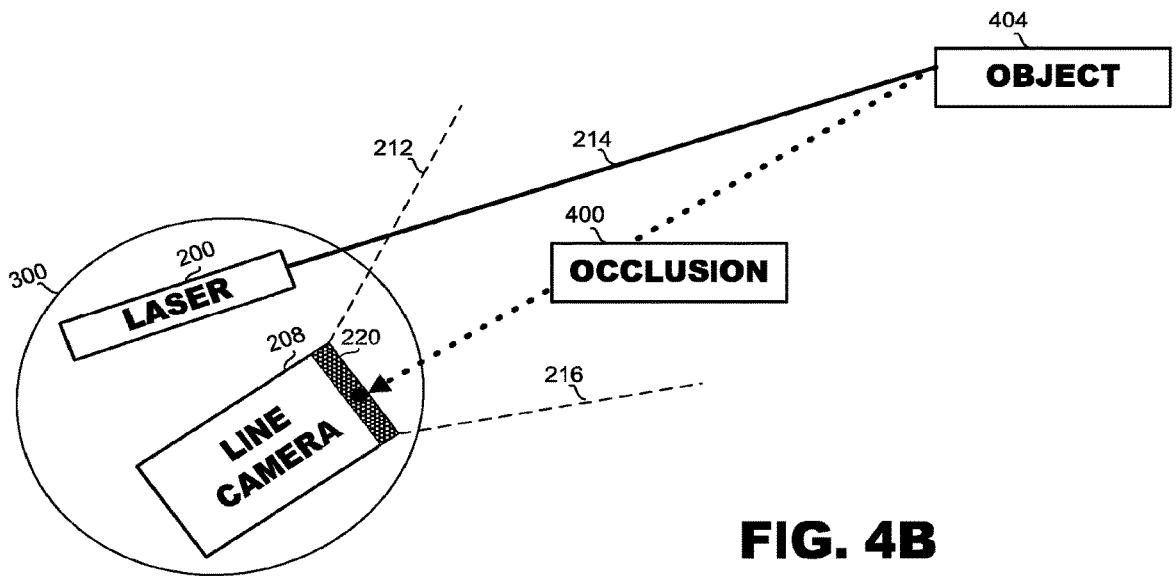

FIG. 4B shows rotating base 300 at a second position, after having turned a part of a circle, in which occlusion 400 disables line camera 208 from capturing object 404.

Thus, occlusion 400 interferes with mapping the environment on two portions of each cycle: if the occluding object blocks the light emitted by laser 200 from reaching object 404, or if the occluding object blocks line camera 208 from capturing the object or the part thereof which is being lighted.

One technical solution provided by the current disclosure relates to a vertically-arranged Lidar, in which the line camera is installed such that the row of pixels is vertical, and the light source is above or below the line camera, and wherein the light is emitted along a line which is on the same plane as the field of view of the line camera. Thus, the areas occluded due to objects interfering with the line cameras include the areas occluded due to objects interfering with the emitted light, thus eliminating some of the occluded areas and increasing the field of view.

Figure 5:
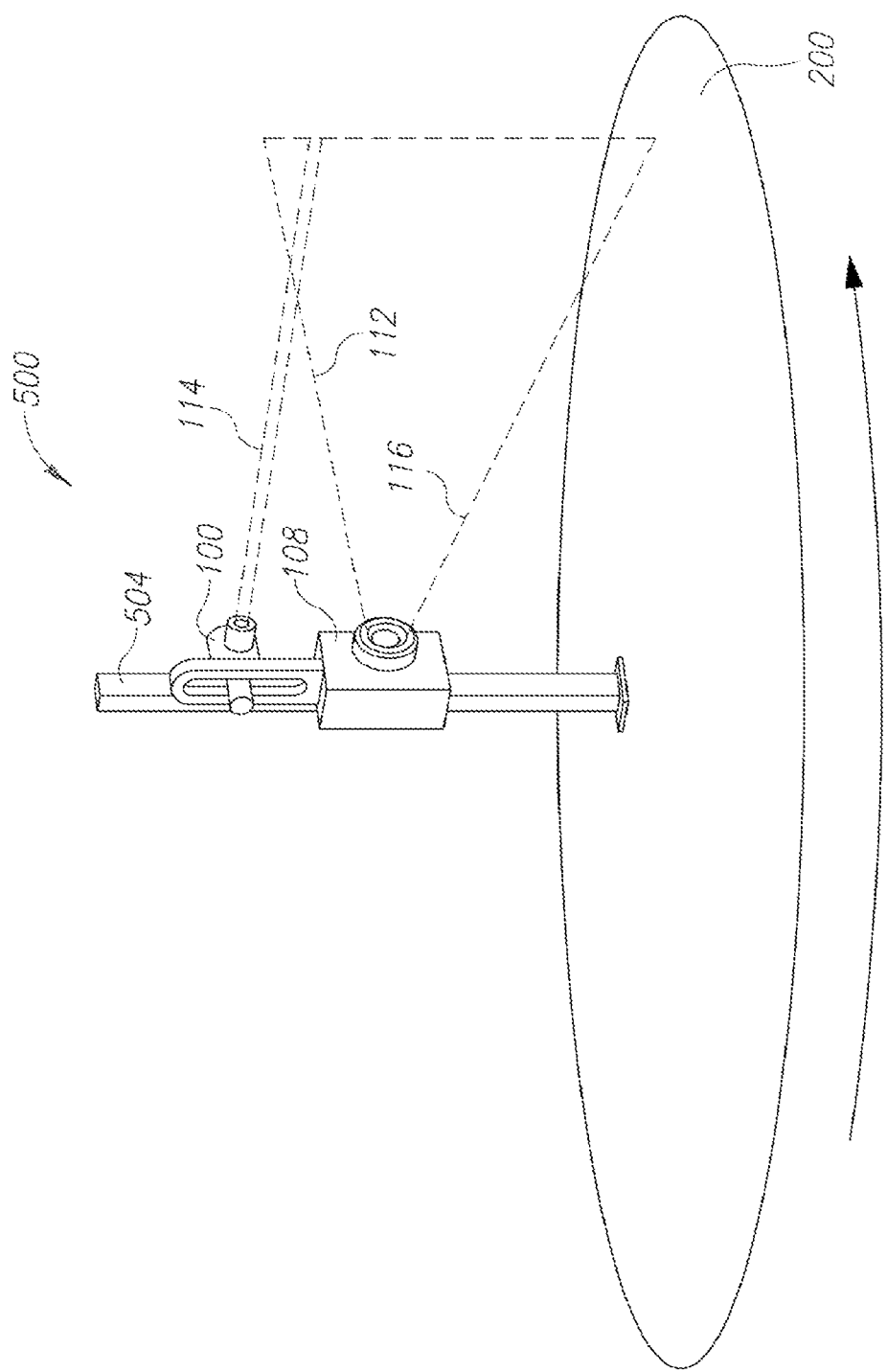
FIG. 5 provides a schematic illustration of a Lidar device for mapping an environment, in accordance with an example of the presently disclosed subject matter.

FIG. 5, shows a schematic illustration of a Lidar device in accordance with some embodiments of the disclosure.

The device, generally referenced 500, comprises light source 100 and line camera 108, having a row of pixel sensors, such that a line connecting light source 100 and line camera 108, for example a line going along or in parallel to support 504, is perpendicular to rotating plate 200, which rotates light source 100 and line camera 108. The device can be installed such that the row of pixels is also substantially vertical to rotating plate 200, and such that the row of pixels, which is generally located between where virtual rays 112 and 116 meet camera 108, is on the same plane as line of light 114 emitted by light source 100, such that if light emitted by laser 100 hits an object, line camera 108 is guaranteed to capture it.

The vertical arrangement of the device provides for a field of view with reduced occluded areas, such that by installing the Lidar on a rotating element, a larger part of the surroundings can be mapped and static or dynamic objects will occlude a smaller part of the field of view.

It will be appreciated that the Lidar device may also comprise additional components such as a lens assembly for directing, focusing, or receiving the light as required.

Figure 6:
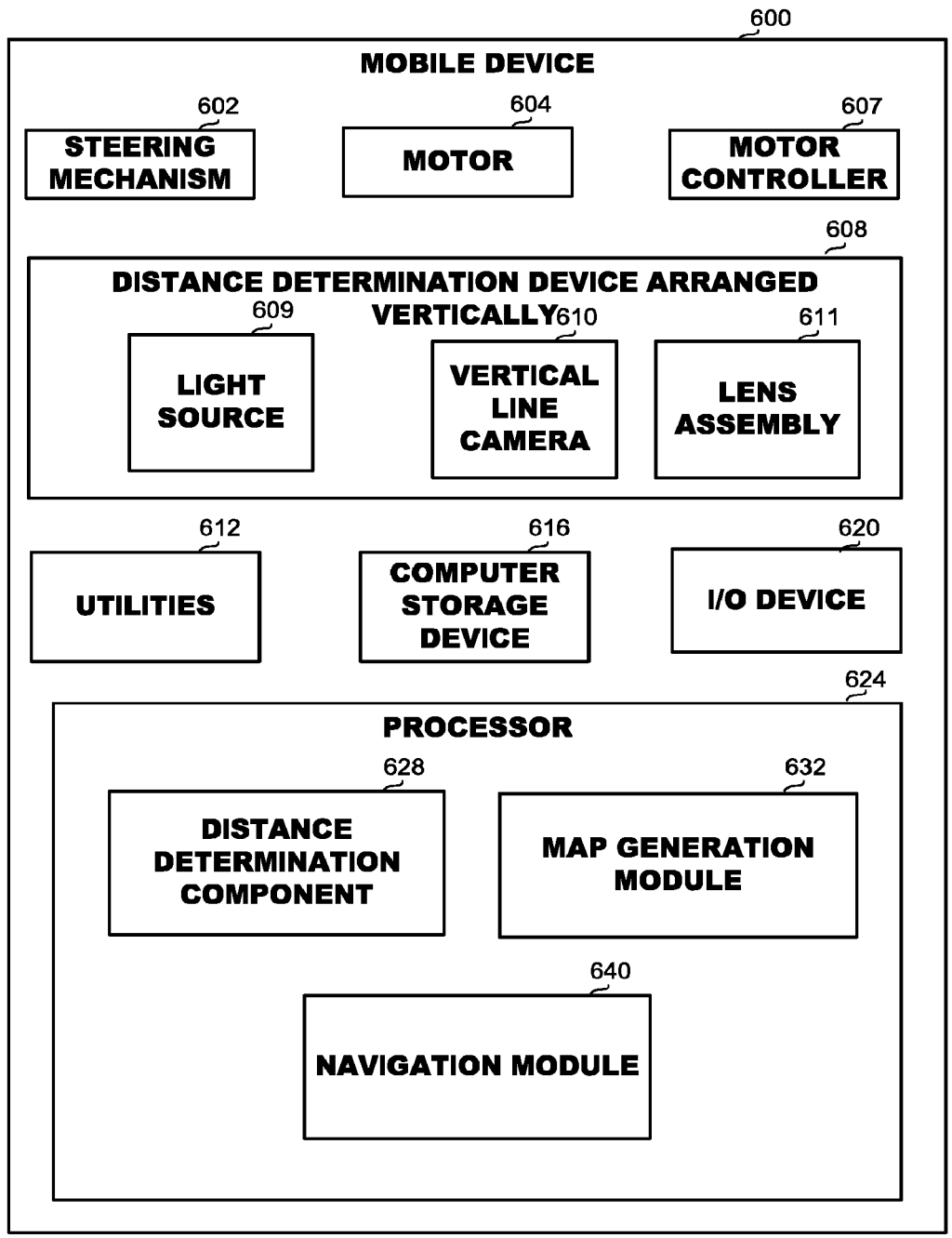
FIG. 6 shows a functional block diagram of a mobile device using a Lidar device for mapping an environment, in accordance with an example of the presently disclosed subject matter.

FIG. 6, shows a functional block diagram of a mobile device, such as a robot, comprising a mapping system in accordance with the disclosure. Reference is also made to FIG. 4, showing an illustration of the robot.

The mobile device, generally referenced 600, comprises a steering mechanism 602 which can be located at its bottom part 404 of FIG. 4. Device 600 can also comprise motor 604 for activating steering mechanism 602, and motor controller 607 for providing commands to motor 604 in accordance with the required motion.

Mobile device 600 can further comprise a distance determination device arranged vertically 608, also referred to as a Lidar system, used as part of mapping device 408 for mapping the environment. The Lidar system comprises a light source 609 and a line camera 610 arranged vertically as shown in association with FIG. 5 above. Lidar system 608 can also comprise a lens assembly 611 for directing, focusing, or receiving light as required. Lidar system 608 can also comprise a processor as described below in association with processor 624.

In some embodiments, Lidar system 608 may rotate, for example at a rate of 600 RPM, such that at least 600 times every minute objects surrounding the device may be captured and analyzed.

Mobile device 600 may further comprise utilities 612 such as a tray 416 for carrying items, a display device 414, or the like.

Display device 414 may display an illustration of the environment in accordance with the distances of object at any direction, as determined by Lidar system 608, thus providing some visualization of the environment. Display device 414 can also display captured video or images, alerts, entertainment information, required information such as items to carry, or any other information. Utilities 612 may also comprise a speaker for playing or streaming sound, a basket, or the like Mobile device 600 may further comprise one or more computer storage devices 616 for storing data or program code operative to cause mobile device 600 to perform acts associated with any of the steps of the methods detailed below or with any other steps related for example to navigation of the robot. Storage device 616 may be persistent or volatile. For example, storage device 616 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like.

In some exemplary embodiments of the disclosed subject matter, mobile device 600 may comprise one or more Input/Output (I/O) devices 620, which may be utilized to receive input or provide output to and from mobile device 600, such as receiving commands, displaying instructions, or the like. I/O device 620 may include previously mentioned members, such as display 414, speaker, microphone, a touch screen, or others.

In some exemplary embodiments, mobile device 600 may comprise one or more processors 624. Each processor 624 may be a Central Processing Unit (CPU), a microprocessor, an electronic circuit, an Integrated Circuit (IC) or the like. Alternatively, processor 624 can be implemented as firmware programmed for or ported to a specific processor such as digital signal processor (DSP) or microcontrollers, or can be implemented as hardware or configurable hardware such as field programmable gate array (FPGA) or application specific integrated circuit (ASIC).

In some embodiments, one or more processor(s) 624 may be located remotely from mobile device 600, such that some or all computations are performed remotely from the device and the results are transmitted via a communication channel to mobile device 200.

It will be appreciated that processor(s) 624 can be configured to execute several functional modules in accordance with computer-readable instructions implemented on a non-transitory computer-readable storage medium, such as but not limited to storage device 616. Such functional modules are referred to hereinafter as comprised in the processor.

The components detailed below can be implemented as one or more sets of interrelated computer instructions, executed for example by processor 624 or by another processor. The components can be arranged as one or more executable files, dynamic libraries, static libraries, methods, functions, services, or the like, programmed in any programming language and under any computing environment.

Processor 624 can comprise distance determination module 628, for determining the distance to the nearest object in a particular direction, based on one or more readings received from vertical line camera 610.

Processor 624 can comprise distance determination module 628, for generating a map or another representation of the environment, based on the distances from the Lidar system to the nearest objects in different directions. For example, similar readings in close directions may be interpreted as single objects, and significant differences in distances may be interpreted as free areas between objects, or direction at which the nearest object is farther away.

Processor 624 can comprise navigation module 640 for planning and following a path within the environment, based on the gathered object information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A light detection and ranging device, comprising:
at least one laser light source configured to emit a pattern of light at a multiplicity of directions within a vertical plane, thus forming a light pattern in an environment of the device;
at least one camera comprising at least one row of pixel sensors having a field of view;
wherein the pattern of light emitted by the at least one light source is on a same plane as the field of view of the at least one row of pixel sensors;
a rotating member, configured to rotate the light source and the camera at a rate of 2 to 600 rounds per minute, wherein said at least one camera is positioned such that the row of pixels is vertical, and the laser light source is above or below said at least one camera; and
wherein the at least one laser light source is adjustable in respect of an angle and distance to the at least one camera, in accordance with the expected range of distances between the at least one laser light source and objects in the environment and a required resolution.

2. The device of claim 1, wherein the at least one laser light source and the at least one camera are installed on the rotating member.

3. The device of claim 2, wherein the at least one laser light source and the at least one camera are installed on a structure perpendicular to a rotation plane of the rotating member, wherein the rotating member rotates the at least one laser light source and the at least one camera.

4. The device of claim 1, wherein the at least one row of pixel sensors is perpendicular to a rotation plane of the rotating member, wherein the rotating member rotates the light detection and ranging device.

5. The device of claim 1, wherein the at least one camera is a line-scan camera.

6. A robot comprising:
a laser light source configured to emit a pattern of near-infrared (NIR) light at a multiplicity of directions within a vertical plane, thus forming a light pattern in an environment of the robot;
a line-scan camera comprising at least one row of pixel sensors having a field of view, wherein the pattern of NIR light emitted by the light source is on a same plane as the field of view of the at least one row of pixel sensors;
a rotating member, the rotating member configured to rotate the light source and the camera at a rate of 2 to 600 rounds per minute, wherein said row of pixels is vertical and the laser light source is above or below said at least one camera; and
wherein the laser light source is adjustable in respect of an angle and distance to the line-scan camera, in accordance with the expected range of distances between the laser light source and objects in the environment and a required resolution; and
a processor configured to: determine a navigation path for the robot within an environment of the robot based on one or more readings received from the vertical row of pixel sensors.

7. The robot of claim 6, wherein the laser light source and the camera are installed on the rotating member.

8. The robot of claim 6, wherein the light source and the camera are installed on a structure perpendicular to a rotation plane of the rotating member.

9. The robot of claim 6, wherein the at least one row of pixel sensors is perpendicular to a rotation plane of the rotating member.

10. A method for determining a distance of an object from a device, comprising:
adjusting a distance and angle between a line-scan camera and a laser light source in accordance with the expected range of distances between the laser light source and objects in the environment and a required resolution;
emitting, by the laser light source associated with the device, a pattern of near-infrared (NIR) light at a multiplicity of directions within a vertical plane, thus forming a light pattern in the environment;
capturing the light pattern by the line-scan camera, wherein the line-scan camera comprises at least one row of pixel sensors having a field of view, and wherein the pattern of NIR light emitted by the laser light source is on a same plane as the field of view of the at least one row of pixel sensors;
receiving an indication of pixels from the at least one row of pixel sensors which capture a location at which the pattern of NIR light hit the object, wherein the pattern of NIR light emitted by the laser light source is on a same plane as a field of view of the at least one row of pixel sensors, wherein said at least one row of pixel sensors is vertical and the light source is above or below said camera;
determining a distance of the object from the device, in accordance with the indication, and navigating the device within its environment, based on one or more readings from the at least one row of pixel sensors.

11. The method of claim 10, wherein the laser light source and the camera are installed on a rotating member.

12. The method of claim 11, wherein the laser light source and the camera are installed on a structure perpendicular to a rotation plane of the rotating member, and wherein the method further comprises rotating the rotating member and generating a map of the environment based on the readings from the at least one row of pixel sensors, wherein similar readings of the one or more readings in close directions of the multiplicity of directions are interpreted as single objects, and significant differences in the readings of the one or more readings are interpreted as free areas between objects.

13. The method of claim 11, wherein the row of pixel sensors is perpendicular to a rotation plane of the rotating member.

\* \* \* \* \*